US005944927A

United States Patent [19]
Seifert

[11] Patent Number: 5,944,927
[45] Date of Patent: Aug. 31, 1999

[54] SECURITY PAPER HAVING AN EMBEDDED SECURITY THREAD AND A PROCESS FOR MAKING THE SECURITY PAPER

[75] Inventor: Harry Allen Seifert, Kettering, Ohio

[73] Assignee: The Standard Register Company, Dayton, Ohio

[21] Appl. No.: 08/865,546

[22] Filed: May 29, 1997

[51] Int. Cl.[6] .......... B32B 31/12

[52] U.S. Cl. .......... 156/153; 156/166; 156/257; 283/72; 283/902; 428/916

[58] Field of Search .......... 156/153, 166, 156/257, 303.1; 283/72, 82, 83, 91, 92, 902; 427/289, 290; 428/916

[56] References Cited

U.S. PATENT DOCUMENTS

| | | | |
|---|---|---|---|
| 3,860,796 | 1/1975 | Wallace et al. . | |
| 4,183,989 | 1/1980 | Tooth . | |
| 4,472,627 | 9/1984 | Weinberger . | |
| 4,500,777 | 2/1985 | Drexler | 235/487 |
| 4,506,915 | 3/1985 | Haghiri-Tehrani et al. . | |
| 4,534,398 | 8/1985 | Crane . | |
| 4,662,653 | 5/1987 | Greenaway . | |
| 4,687,231 | 8/1987 | Hartmann . | |
| 4,756,557 | 7/1988 | Kaule et al. . | |
| 4,852,911 | 8/1989 | Hoppe | 283/82 |
| 4,889,366 | 12/1989 | Fabbiani | 283/83 X |
| 4,943,093 | 7/1990 | Melling et al. . | |
| 5,093,184 | 3/1992 | Edwards . | |
| 5,112,672 | 5/1992 | Kaule et al. . | |
| 5,176,405 | 1/1993 | Kaule et al. . | |
| 5,248,544 | 9/1993 | Kaule . | |
| 5,255,129 | 10/1993 | Jones . | |
| 5,324,079 | 6/1994 | Kaule et al. . | |
| 5,354,099 | 10/1994 | Kaule et al. . | |
| 5,383,687 | 1/1995 | Suess et al. . | |
| 5,423,732 | 6/1995 | Coe | 493/324 |
| 5,480,685 | 1/1996 | Suzuki et al. . | |
| 5,486,022 | 1/1996 | Crane . | |
| 5,509,691 | 4/1996 | Kaule et al. . | |
| 5,516,153 | 5/1996 | Kaule . | |
| 5,567,276 | 10/1996 | Boehm et al. | 162/103 |
| 5,639,126 | 6/1997 | Dames et al. . | |
| 5,876,068 | 3/1999 | Schneider et al. | 283/86 |

FOREIGN PATENT DOCUMENTS

| | | |
|---|---|---|
| 0 251 253 | 1/1988 | European Pat. Off. . |
| 0 626 275 | 11/1994 | European Pat. Off. . |

OTHER PUBLICATIONS

U.S. application No. 08/865,136, filed May 29, 1997, Washburn et al., Security Paper Having an Embedded and Deformed Security Thread and a Process for Making the Security Paper.

*Primary Examiner*—Michael W. Ball
*Assistant Examiner*—Shawn A. Mitchell
*Attorney, Agent, or Firm*—Killworth, Gottman, Hagan & Schaeff, LLP

[57] ABSTRACT

Security paper, security documents made from the security paper, and processes for making the security paper, are provided. A groove is formed in paper and a security element is positioned or bonded within the groove. A coating is applied over the security element so that the coating covers at least a portion of the security element and is coplanar with the surface of the paper. The security element may include any combination of security features for verification of document authenticity.

37 Claims, 6 Drawing Sheets

SECURITY PAPER HAVING AN EMBEDDED SECURITY THREAD AND A PROCESS FOR MAKING THE SECURITY PAPER

BACKGROUND OF THE INVENTION

The present invention generally relates to security paper and, in particular, to security paper having security threads, and to processes for making the security paper.

Many documents of value, such as bank notes, currency, checks, stock certificates, and bonds, are provided with security features for preventing illicit copying and forgery. One such security feature is the use of security paper which is not widely available and difficult to simulate. There are a number of known security features that may be included in security paper, one of which is the inclusion of threads of various materials in the paper.

Such security threads may typically consist of metallic threads, colored threads, optical threads or magnetic threads. Embedded metallic threads beneath the surface of the security paper are not readily apparent in reflected light but are immediately apparent in transmitted light, as a dark image of the threads is seen when the document is illuminated from behind. Metallic threads are simple in concept, but provide an effective anti-copying function. The optical feature of metallic threads cannot be copied by a photocopier or simulated by printing a line on the surface of the security paper.

Colored threads consist of thin filaments of colored material which are typically below, but sufficiently close to, the surface of the paper so as to be visible. Colored threads in security documents are typically apparent upon visual inspection under normal lighting, and are common in currency. Optical threads are filaments of material which are reflective, diffractive or fluorescent. Such threads are sufficiently close to the surface of the paper as to be readily identifiable in ambient light or ultraviolet light. Magnetic threads are filaments of material that are typically identifiable by machine. Such threads may be formed of any one of a number of magnetic materials. Security threads of any of these types may be formed into readily identifiable characters for further visual confirmation of document authenticity.

Security threads are typically embedded into the security paper at the time that the paper is manufactured. Such a papermaking process is very expensive, adding significantly to the overall cost of the paper. Accordingly, there remains a need in the art for security features which may be added to less expensive paper, after the paper is manufactured (i.e., post-manufactured), thereby reducing the manufacturing costs of the security paper.

SUMMARY OF THE INVENTION

The present invention meets the aforementioned needs by providing security paper, security documents made with such paper, and a process for making the security paper which is simple and cost effective. A process for making security paper comprises providing a post-manufactured paper having an upper surface and a lower surface. At least one groove is formed in one of the upper and lower surfaces of the paper. At least one security element is placed in the at least one groove. A coating is applied over at least a portion of the at least one security element within the at least one groove. The coating may be substantially coplanar with the upper or lower surface of the paper. The at least one groove may be formed by applying pressure to a portion of the upper or lower surface of the paper. The pressure is applied to the portion of the upper or lower surface of the paper by rolls. Alternatively, the at least one groove in the upper or lower surface of the paper may be formed by abrading a portion of the upper or lower surface of the paper.

The process may include bonding the at least one security element in the at least one groove. Bonding the at least one security element in the at least one groove may include applying a pressure sensitive adhesive to the at least one security element or in the at least one groove. Alternatively, bonding the at least one security element in the at least one groove may include applying heat and pressure to the at least one security element. The at least one security element may be positioned and bonded in the at least one groove as the at least one groove is formed.

The paper may comprise a sheet of paper or a paper web. The at least one security element may include a surface having printed matter. Further, the at least one security element may comprise a fluorescent material, an optically variable element, a metallic material, a magnetic material, or a plastic material. The at least one security element may be selected from the group consisting of filaments, threads, and films. A width of the at least one security element may be varied by varying at least one of a temperature, pressure or tension of the at least one security element as it is placed in the at least one groove. The at least one security element may be discontinuous and further comprised of a plurality of interdispersed elements. The at least one groove may be formed in a direction which is substantially parallel to a machine direction. The at least one groove may be substantially linear or curvilinear.

The coating may be applied over a plurality of portions of the at least one security element. The coating over the plurality of portions may be configured so as to form printed matter. The coating may include paper material, plastic material or an adhesive. A color of the coating may substantially match a color of the paper.

The process may further comprise forming another groove in one of the upper and lower surfaces of the paper. Another security element may be placed in the another groove. A coating may be applied over at least a portion of the another security element within the another groove. The at least one groove and the another groove may be formed on the same surface or opposite surfaces of the paper. The at least one security element and the other security element may overlap. The at least one security element may be a first color and the another security element may be a second color. The first color may be different than the second color.

The paper may comprise material selected from the group consisting of wood pulp, vegetable fibers, and plant fibers. The paper may also comprise material selected from the group consisting of plastics, synthetics and polymeric films.

According to another aspect of the present invention, a security paper comprises at least one security element and a paper having an upper surface and a lower surface. At least one of the upper and lower surfaces of the paper includes at least one groove formed therein for receiving the at least one security element. A coating covers at least a portion of the at least one security element within the at least one groove. The coating may be substantially coplanar with the upper or lower surface of the paper. The security paper may include additional features described above with respect to the process of making the security paper.

According to yet another aspect of the present invention, a security document comprises security paper having an upper surface and a lower surface with at least one of the upper and lower surfaces carrying printed indicia. The security paper comprises a paper having an upper surface corresponding to the upper surface of the security paper and a lower surface corresponding to the lower surface of the security paper. At least one of the upper and lower surfaces of the paper includes at least one groove formed therein for receiving at least one security element. A coating covers at least a portion of the at least one security element within the at least one groove. The coating may be substantially coplanar with the upper or lower surface of the paper. The security paper of the security document may include additional features described above with respect to the process of making the security paper.

Other objects and advantages of the invention will be apparent from the following description, the accompanying drawings and the appended claims.

DETAILED DESCRIPTION OF THE PREFERRED EMBODIMENTS

FIGS. 1–4 illustrate a process for making security paper 10 according to an embodiment of the present invention. It should be appreciated that these figures, as well as FIGS. 5B and 6B, are greatly enlarged, not drawn to scale, and are presented solely for illustrative purposes. The balance of the figures are also not drawn to scale. A paper 12 is provided having an upper surface 12A and a lower surface 12B. While in the illustrated embodiment, the paper 12 is comprised of wood pulp fibers, it will be appreciated to those skilled in the art, that the paper 12 may be comprised of a substrate having any of a variety of suitable materials, such as vegetable fibers, plant fibers, additives, fillers, plastics, synthetics, polymeric films and combinations of such materials. Further, the paper 12 may be comprised of a web of paper material or individual sheets of paper material.

Figure 1A:
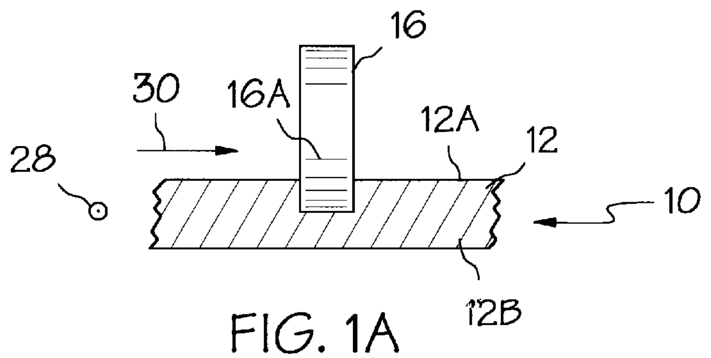
FIGS. 1A and 1B are enlarged, partial sectional views of a first manufacturing act for making security paper, constructed according to a first aspect of the present invention.
Figure 2A:
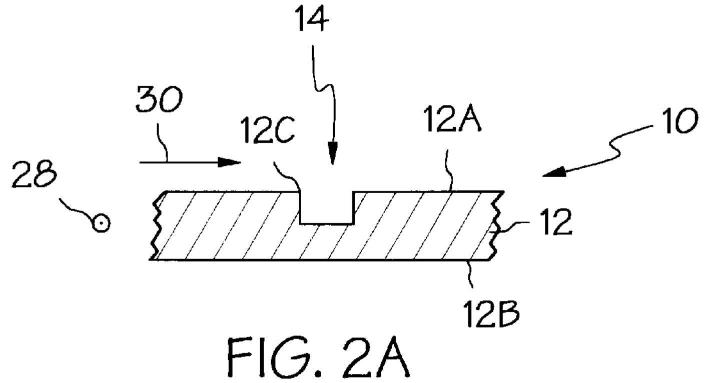
FIGS. 2A and 2B are enlarged, partial sectional views of a first manufacturing act for making security paper, constructed according to another aspect of the present invention.
Figure 2B:
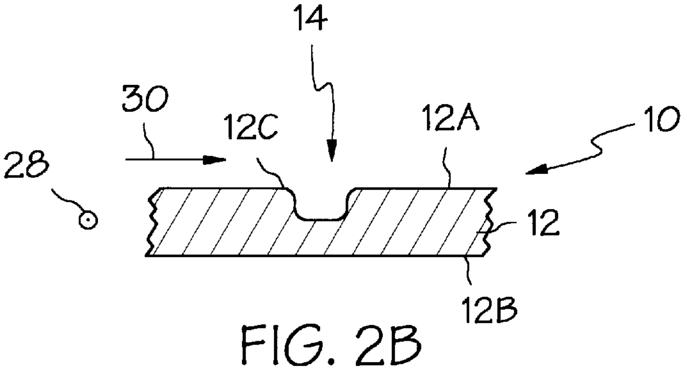
Figure 3C:
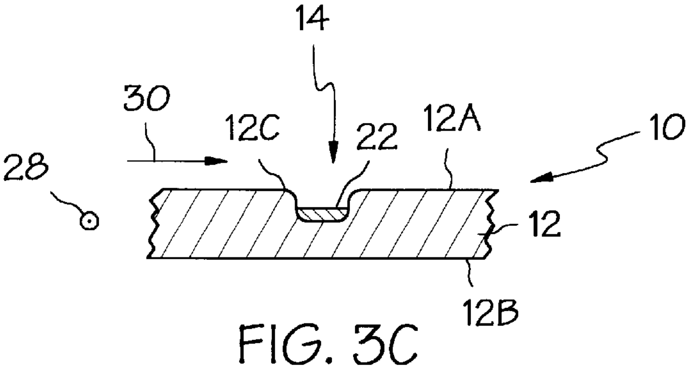
FIG. 3C is an enlarged, partial sectional view of another manufacturing act for making security paper, constructed according to yet another aspect of the present invention.

As shown in FIGS. 2A and 2B, a groove 14 is formed in a portion 12C of the paper 12. According to a first aspect of the present invention, the groove 14 is formed in the paper 12 by abrading the upper surface 12A with a rotating cylinder 16, as shown in FIG. 1A. The cylinder 16 includes a rough surface 16A. The rotating cylinder 16 contacts the upper surface 12A of the paper 12 and the groove 14 is formed as the rough surface 16A rubs away a portion of the upper surface 12A of the paper 12. It will be appreciated by those skilled in the art that the depth of the groove 14 is dependent, in part, on the pressure exerted by the cylinder 16 on the paper 12 and thickness of the paper 12.

Figure 1B:
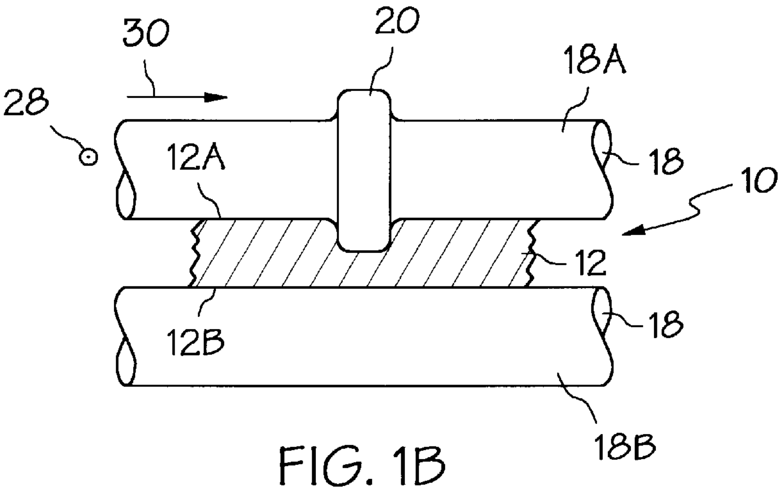

Alternatively, the groove 14 may be formed in the portion 12C of the paper 12 by compressing the upper surface 12A with rollers 18A, 18B, as shown in FIG. 1B. The arrangement of the rollers 18A, 18B is commonly known as a two-roll calendar, with the rollers 18A, 18B commonly known as calendaring rollers. The bottom surface 12B of the paper 12 is supported by the bottom roller 18B while the groove 14 is formed by the top roller 18A. The top roller 18A includes a raised portion 20 which compresses the paper 12, and thus, forms the groove 14. In the illustrative embodiment, the paper 12, comprised of wood pulp material, may be compressed up to approximately 60% of its nominal thickness under the application of approximately 400 lbs. per linear inch (PLI) of pressure. As shown in FIGS. 2A and 2B, the abraded groove 14 has relatively vertical sidewalls while the compressed groove 14 is slightly rounded along the bottom and top portions of the groove 14. It will be appreciated by those skilled in the art that degree of rounding of the bottom and top portions of the compressed groove 14 is dependent, in part, on the pressure applied by the rollers 18 and the composition of the paper 12. It will be further appreciated by those skilled in the art that the security element 22 may be positioned within the groove 14 as the compressed groove 14 is formed. As shown in the illustrated embodiment, the groove 14 is formed along a substantially straight or linear line within the paper 12.

Figure 3A:
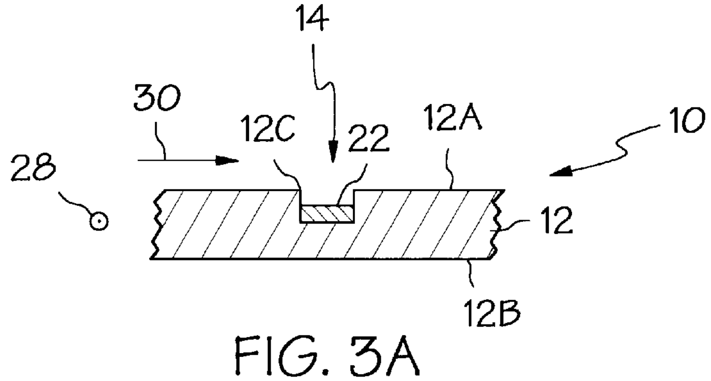
FIG. 3A is an enlarged, partial sectional view of another manufacturing act for making security paper, constructed according to another aspect of the present invention.
Figure 3B:
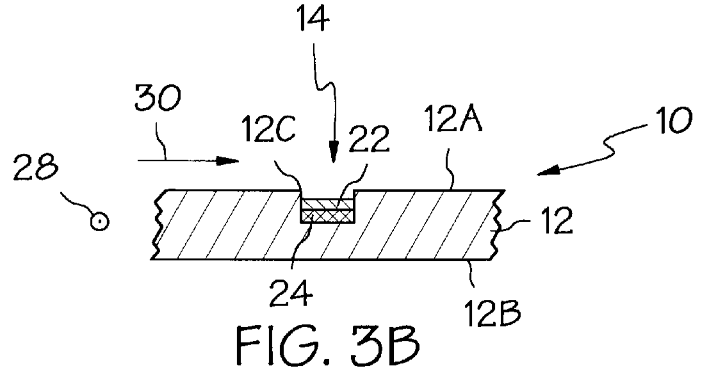
FIG. 3B is an enlarged, partial sectional view of another manufacturing act for making security paper, constructed according to yet another aspect of the present invention.

As shown in FIG. 3A, once the groove 14 is formed in the paper 12, a security element 22 is positioned within the groove 14. The security element 22 may be merely placed within the groove 14 or bonded in the groove 14. As shown in FIG. 3B, an adhesive 24 may be used to bond the security element 22 in the groove 14. In the illustrated embodiment, a pressure sensitive adhesive 24 may be applied in the groove 14 or directly to the security element 22, prior to positioning the security element 22 within the groove 14. It will be appreciated by those skilled in the art that other adhesives, such as water based or roll applied ultraviolet adhesives may be used.

Alternatively, sufficient heat and sufficient pressure may be applied to the security element 22 to bond it in the groove 14. As shown in FIG. 1B, the rollers 18A, 18B may be used to apply the heat and pressure to the security element 22. Heat may be transferred to the security element 22 by the raised portion 20 of the top roller 18A while pressure is applied to the security element 22 as the paper 12 passes through the rollers 18A, 18B. It will be appreciated by those skilled in the art that the amount of heat and the amount of pressure which is sufficient to bond the security element 22 in the groove is dependent, in part, on the types of security element and paper used. In the illustrated embodiment, a security element 22 comprised of nylon material may be bonded in the groove 14 formed in paper comprised of wood pulp material upon the application of over 400° F. of heat and approximately 400 PLI of pressure. It will be further appreciated by those skilled in the art that the security element 22 may be positioned and bonded in the groove 14 as the groove 14 is formed. In the illustrated embodiment, the groove 14 and the security element 22 are oriented in a machine direction 28 of the web of paper 12 which is out of the plane of the page of FIGS. 1–4. The machine direction 28 of the web of paper 12 is defined as the direction in which the web of paper 12 is passed as the security paper 10 is formed. However, it will be appreciated by those skilled in the art, that the groove 14 and the security element 22 may be oriented in a cross-web direction 30 which is substantially perpendicular to the machine direction 28.

Figure 4:
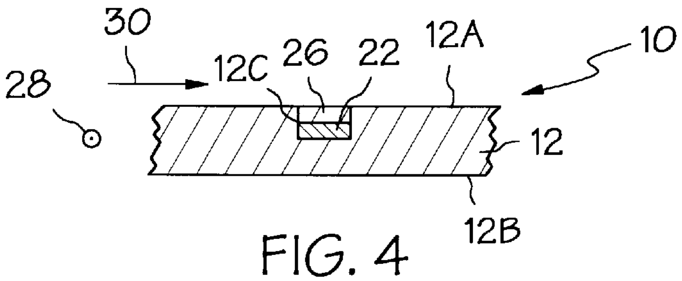
FIG. 4 is an enlarged, partial sectional view of yet another manufacturing act for making security paper.

As shown in FIG. 4, once the security element 22 is positioned and/or bonded in the groove 14, a coating 26 is applied over at least a portion of the security element 22. The coating 26 covers at least a portion of the security element 22 and also contacts a portion of the groove 14. Depending on the size of the groove 14 and the shape and configuration of the security element 22, the coating 26 may contact the bottom portion and/or side portions of the groove 14. In the illustrated embodiment, the upper surface of the coating 26 is substantially coplanar with the upper surface 12A of the paper 12. The paper 12 may be stacked or folded relatively easily, as there are no raised surfaces to interfere with the stacking or folding of the paper 12. Further, a coating 26 which is substantially coplanar with the upper surface 12A presents a substantially flat and uniform upper surface 12A so that the security paper 10 may be passed through a laser printer or the like without interference.

The coating 26 may be comprised of any of a variety of materials, such as liquid paper, paper filler, paper base, natural fibers, synthetic fibers, or any combination of the same. In the illustrated embodiment, the coating 26 comprises a slurry of material which is the same or similar material used to form the paper 12, so that the paper 12 appears unaltered after the security element 22 is covered. Similarly, a color of the paper material or coating 26 may substantially match a color of the paper 12 so that the paper 12 appears unaltered post processing. Correspondingly, the security element 22 may be invisible or partially visible depending on the depth of the groove 14, the thickness of the coating 26, the color of the paper 12, and the color of the security element 22. A hidden security element 22 may be detected using various machine readers depending on the composition of the security element 22.

The coating 26 may also comprise adhesives or plastic materials. Any adhesive which bonds to the material forming the paper 12 may be used alone or in combination with other coating materials, presuming the adhesive also bonds to the other coating materials. A clear plastic or paper-like material may be used so that the security element 22 is visible. The coating 26 may be applied along the entire length of the security element 22 or along discrete portions of the security element 22. A partially exposed or visible security element 22 yields an additional security feature as the security element 22 may be visually perceived for verification of document authenticity.

Figure 5A:
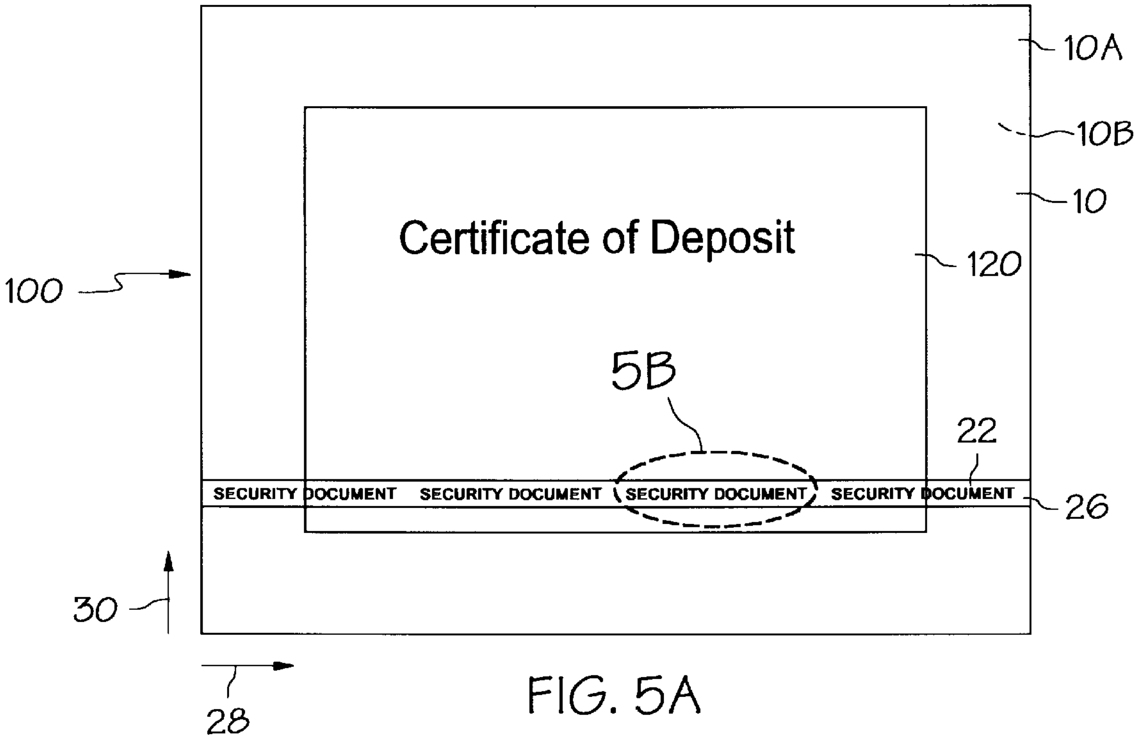
FIG. 5A is a plan view of a security document according to yet another aspect of the present invention.
Figure 5B:
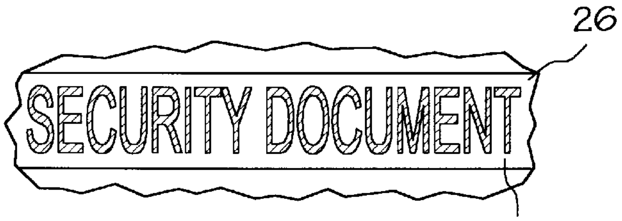
FIG. 5B is an enlarged partial view of the portion 5B (shown in FIG. 5A) of the security document of FIG. 5A.

As shown in FIGS. 5A and 5B, the coating 26 may be applied along a plurality of portions of the security element 22 so that printed matter is formed. The printed matter may consist of symbols, letters, numbers or any combination of the same so as to provide a visual indication of authenticity. The coating 26 may form reverse printed matter in that the uncoated portions form the printed matter. The coating 26 may also include optically reflective material as another security feature of the security paper 10. The coating 26, as shown in FIGS. 5A and 5B, is arranged on the security paper 10 so as to form the printed matter "SECURITY DOCUMENT". The security element 22 is visible and serves as a background for the printed matter. The color of the coating 26 substantially matches the color of the paper 12 so that the printed matter appears to be engraved into the paper 12.

As is clearly illustrated in FIG. 5A, the paper includes two pairs of opposing side edges and the security element 22 extends from one of the side edges of the paper 12 to an opposing side edge of the paper 12. As is noted above, the security element 22 is positioned in the groove 14, see FIGS. 2A and 3A.

In the illustrated embodiment, the security element 22 is added to the paper 12 after the paper 12 is manufactured. For descriptive purposes, the paper 12 is transformed into the security paper 10 once the security element 22 is added to the paper 12. As described above, in the prior art it was typical for security features to be added to the paper during the paper manufacturing process, significantly increasing the costs of manufacture. Since the security element 22 may be added to the paper 12 after the paper 12 has been manufactured, virtually any manufactured paper may be used. The cost of producing the security paper 10 is significantly reduced as the paper 12 does not have to be specially designed or manufactured. Typically, paper processing facilities require large minimum order quantities which may be avoided if commodity grade paper is modified according to an embodiment of the present invention.

The security element 22 may be comprised of any one of a number of various materials having a variety of forms. Specifically, the security element 22 may comprise filaments, threads and films. The filaments, threads and films may have a circular, rectangular, square, or other shape cross-section. The security element 22 may be relatively flat, thick or thin. A surface of the security element 22 may include printed matter for visual confirmation of document authenticity. The printed matter formed on the surface of the security element 22 may consist of symbols, letters, numbers or any combination of the same.

It should be apparent that the security element 22 may need to be relatively near the upper surface 12A of the paper 12 or covered by a relatively clear coating 26 for the printed matter to be visible. Alternatively, the printed matter may be formed in such a manner that it is visible through transmitted light with little to no regard of the position of the security element 22 in the paper 12 or the coating 26 covering the security element 22. As shown in the illustrated embodiment of FIGS. 6A and 6B, a surface of the security element 22 includes the printed matter "SECURITY DOCUMENT". The coating 26 is relatively clear so that the security element 22 and printed matter are visible.

The security element 22 may also include optically variable elements for additional security. An optical variable element comprises optically active layers which contain holographic relief structures, diffraction structures, interference structures, reflection structures, liquid crystal polymers and other optically acting structures. Such structures may be visually perceived as incident light is altered upon contact with the structures. The effectiveness of the optical variable elements is therefore dependent on the amount of light which contacts the structures. Accordingly, it should be apparent that the optical variable elements are best utilized in applications in which the security element 22 is at least partially exposed or covered by a coating 26 which is generally transparent.

The security element 22 may also comprise a fluorescent material as another security feature. Fluorescent materials provide added security to the security paper 10 as incident light having a first wavelength is absorbed by the fluorescent material and light of a different wavelength is radiated by the fluorescent material. For example, the fluorescent material may be sensitive to light in the ultraviolet region, such that as ultraviolet light is projected onto the security paper 10, the security element 22 is illuminated, and a portion of the ultraviolet light is absorbed. The illuminated security element 22 then radiates light in the visual region of the spectrum. Similarly, the coating 26 may include fluorescent material as another security feature of the security paper 10.

The security element 22 may also be comprised of any of a number of high tensile strength materials, such as Kevlar and metallic wire. High tensile strength materials include materials having a tensile strength of at least 27,000 psi. A high tensile strength security element 22 increases the tear resistance of the paper 12. The paper 12 may be torn to the high tensile strength security element 22 at which point further tearing is prevented. The paper 12 may therefore be authenticated by tearing a portion of the paper 12.

The security element 22 may also be comprised of a combination of materials. For example, a plastic material, such as nylon, may be coated with any one of a number of metallic or magnetic materials. The resulting security element may be positioned into the paper 12 and covered with the coating 26 as described above. The security paper 10 will therefore include the inherent security features associated with metallic and magnetic materials as described herein.

The security element 22 may include colored threads which are positioned within a groove 14 which is relatively near the top of the upper surface 12A of the paper 12. A colored thread positioned relatively near the top of the upper surface 12A of the paper 12 is readily discernible by visual inspection for verification of document authenticity. Further, a colored thread is readily discernible by visual inspection when covered with a relatively clear coating 26. The physical characteristics of the security element 22 may be such that the security element 22 may tear or break upon attempts to remove it from the security paper 10. Similarly, the security paper 10 produced according the embodiments of the present invention has an inherent anti-tampering feature as the security element 22 may not be removed without damaging or destroying the underlying paper 10.

Figure 7:
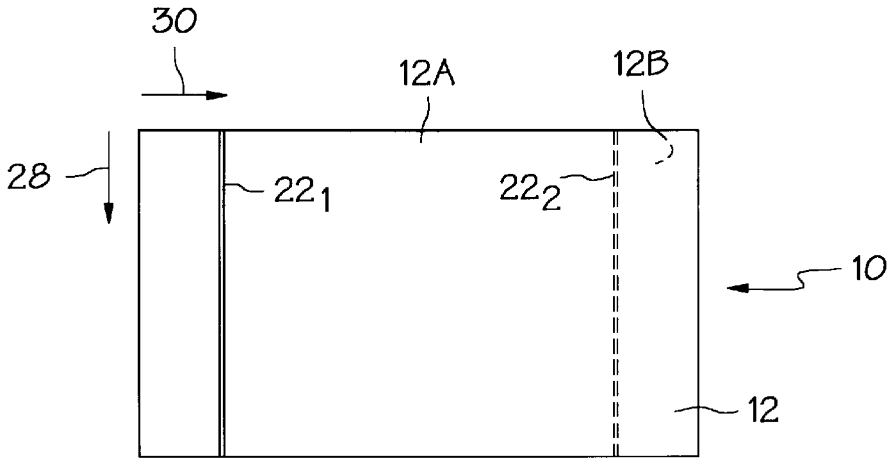
FIGS. 7–13 are plan views of security paper according to yet further aspects of the present invention.

It should be apparent that more than one security element 22 may be applied to one or both of the surfaces 12A and 12B of the paper 12 upon the formation of additional grooves 14. Further, the security element 22 may include one or more of the configurations shown in FIGS. 7–13. Referring to FIG. 7, a first security element $\mathbf{22}_1$ is applied to the upper surface 12A while a second security element $\mathbf{22}_2$ is applied to the lower surface 12B. The first and second security elements $\mathbf{22}_1$ and $\mathbf{22}_2$ may have different colors, widths, shapes or any combination of the same, to further enhance the security features of the security paper 10. For example, the first security element $\mathbf{22}_1$ may be a first color, such as blue, and the second security element $\mathbf{22}_2$ may be a second color, such as red.

Figure 8:
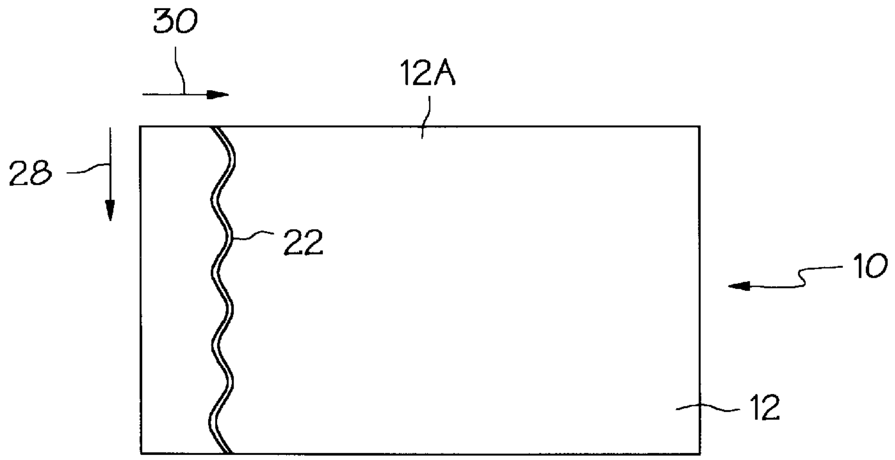
Figure 9:
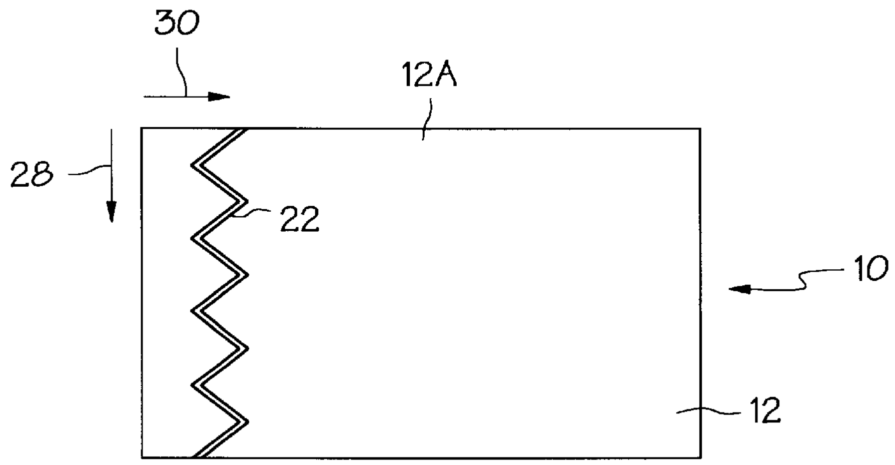

The groove 14, and hence, the security element 22 may have a curvilinear pattern as shown in FIG. 8. The curvilinear pattern of the security element 22 may be symmetrical, such as a sinusoidal wave, or a random asymmetrical pattern. Similarly, the security element 22 may comprise a single diagonal strip across the surface 12A of the paper 12 or a series of asymmetrical or symmetrical diagonal strips. FIG. 9 illustrates a security thread 22 comprising a series of such symmetrical diagonal strips.

Figure 10:
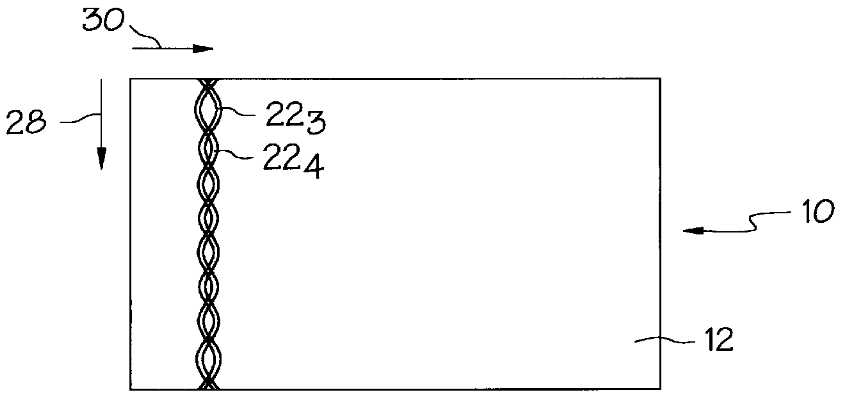

FIG. 10 illustrates a pair of crisscrossing or overlapping security elements $\mathbf{22}_3$ and $\mathbf{22}_4$. As with the security elements $\mathbf{22}_1$ and $\mathbf{22}_2$, the security elements $\mathbf{22}_3$ and $\mathbf{22}_4$ may have different colors, widths, shapes or any combination of the same to further enhance the security features of the security paper 10. The crisscrossing security elements $\mathbf{22}_3$ and $\mathbf{22}_4$ may also be symmetrical, asymmetrical, curvilinear, diagonal or any other reasonable shape. The overlapping security elements $\mathbf{22}_3$ and $\mathbf{22}_4$ may also be formed on opposite surfaces of the paper 12 such that they do not physically touch each other.

Figure 11:
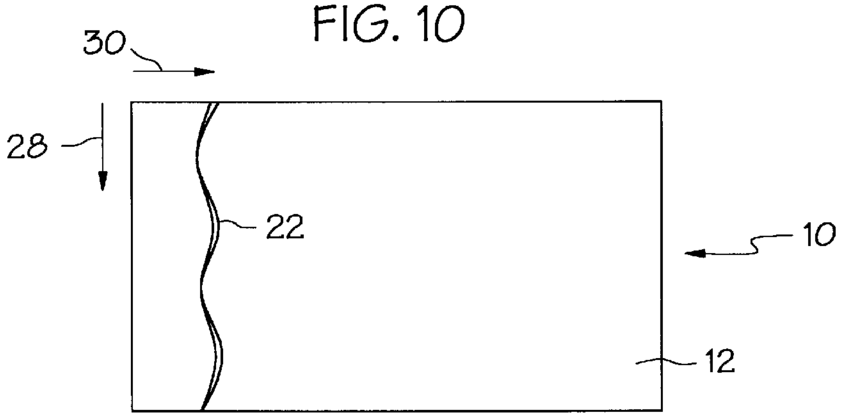

FIG. 11 illustrates a security element 22 having a varying width. The width of the security element 22 may be varied by varying the tension, pressure and/or temperature of the security element 22 as it is applied to the paper 12. A security element 22 with a varying width as shown in FIG. 11 further enhances the security features of the security paper 10, making it more difficult to forge or duplicate.

Figure 12:
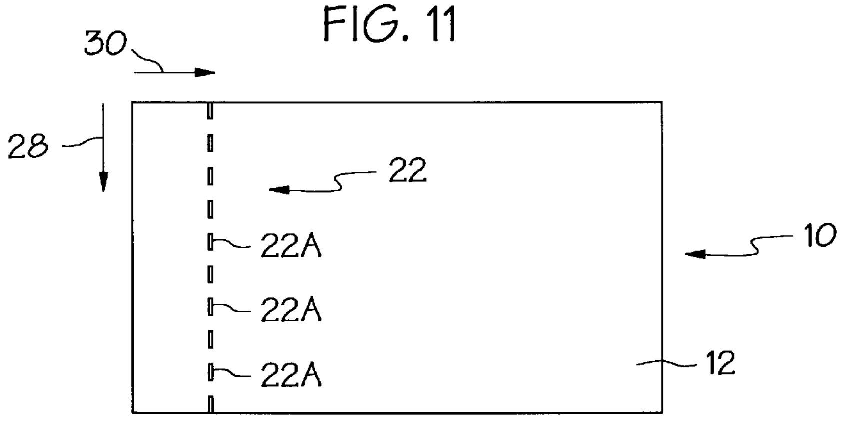
Figure 13:
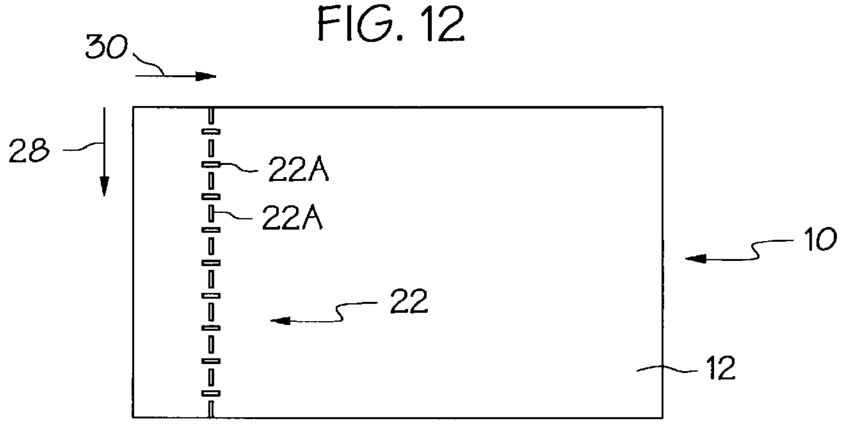

The security element 22 may be a continuous element or discontinuous elements. FIG. 12. illustrates a discontinuous security element 22. The discontinuous security element 22 is formed of a plurality of individual discrete elements 22A which may be oriented in any desired manner. The discontinuous security element 22 may be straight, curvilinear, or zig-zagged. Further, each of the individual elements 22A may have a different color. While in the illustrated embodiment, the individual elements 22A are formed in the machine direction 28, the individual elements 22A may also be formed along the cross-web direction 30 or interspersed along the machine direction 28 and the cross-web direction 30 as shown in FIG. 13.

Figure 6A:
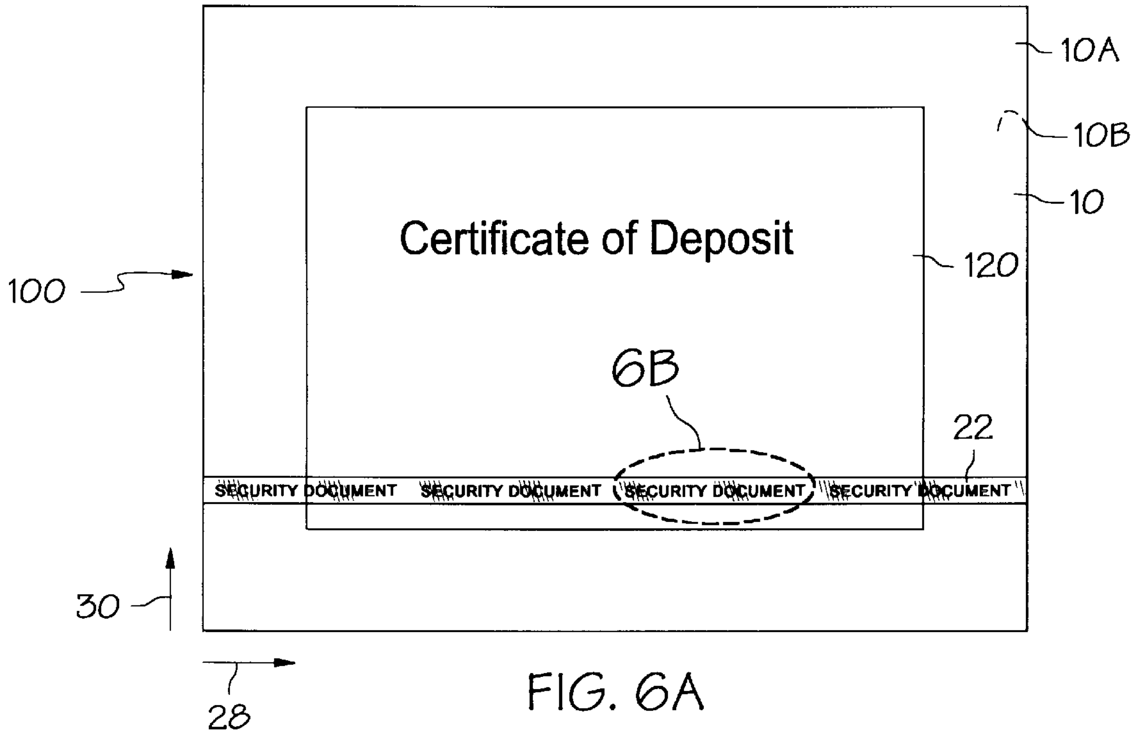
FIG. 6A is a plan view of a security document according to yet another aspect of the present invention.
Figure 6B:
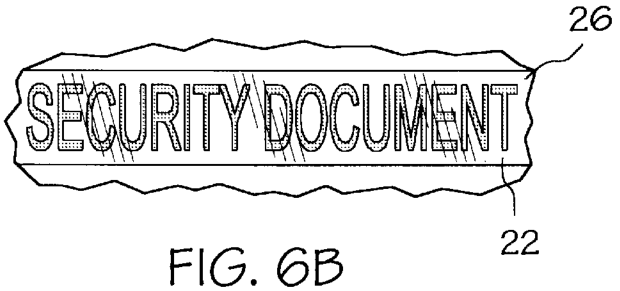
FIG. 6B is an enlarged partial view of the portion 6B (shown in FIG. 6A) of the security document of FIG. 6A.

The above process may be used to produce a security document 100 as shown in FIGS. 5A and 6A. The security document 100 comprises the security paper 10 as described above. The security paper 10 includes an upper surface 10*a* which corresponds to the upper surface 12A of the paper 12, and a lower surface lob which corresponds to the lower surface 12B of the paper 12. The security document 100 is a document of value and may carry printed indicia 120 on one or both surfaces 10A, 10B of the security paper 10. As shown in illustrated embodiment, the security document 100 carries printed indicia 120 on the upper surface 10*a*. The printed indicia 120, such as the printed matter for a bank note, may be applied to the upper surface 10A of the security paper 10 through any printing technique commonly used in the art.

The security element 22 may be added to the paper 12 before the printed indicia 120 is applied to the security paper 10 for optimum security and protection. It should be apparent that the security element 22 may be added to the paper 12 during or after the printed indicia 120 is applied to the security paper 10. In addition, the security paper 10, and hence, the security document 100, may have any combination of security features as described herein. Further, the security paper 10, and hence, the security document 100, may be comprised of paper 12 which has already been manufactured, thereby significantly reducing the manufacturing costs of the security document 100.

Having described the invention in detail and by reference to preferred embodiments thereof, it will be apparent that modifications and variations are possible without departing from the scope of the invention which is defined in the appended claims.

What is claimed is:

1. A process for making security paper comprising:

providing a post-manufactured paper having an upper surface and a lower surface;

forming at least one groove in one of said upper and lower surfaces of said paper, wherein said at least one groove extends from a first side edge of said paper to an opposing side edge of said paper;

placing at least one security element in said at least one groove such that said security element extends from said first side edge of said paper to said opposing side edge of said paper;

applying a coating over at least a portion of said at least one security element within said at least one groove, wherein an upper surface of said coating is substantially coplanar with said upper or lower surface of said paper.

2. A process for making security paper comprising:

providing a post-manufactured paper having an upper surface and a lower surface;

forming at least one groove in one of said upper and lower surfaces of said paper;

placing at least one security element in said at least one groove;

applying a coating over at least a portion of said at least one security element within said at least one groove wherein an upper surface of said coating is substantially coplanar with said upper or lower surface of said paper.

3. A process for making security paper comprising:

providing a post-manufactured paper having an upper surface and a lower surface;

forming at least one groove in one of said upper and lower surfaces of said paper, wherein said at least one groove is formed by applying pressure to a portion of said upper or lower surface of said paper by rolls;

placing at least one security element in said at least one groove, wherein said at least one security element is simultaneously positioned within said at least one groove as said at least one groove is formed;

applying a coating over at least a portion of said at least one security element within said at least one groove, wherein an upper surface of said coating is substantially coplanar with said upper or lower surface of said paper.

4. A process for making security paper comprising:

providing a post-manufactured paper having an upper surface and a lower surface;

forming at least one groove in one of said upper and lower surfaces of said paper;

placing at least one security element in said at least one groove, wherein said at least one security element is simultaneously positioned and bonded in said at least one groove as said, at least one groove is formed;

bonding said at least one security element in said at least one groove by applying heat and pressure to said at least one security element;

applying a coating over at least a portion of said at least one security element within said at least one groove, wherein an upper surface of said coating is substantially coplanar with said upper or lower surface of said paper.

5. The process of claim 4, wherein the act of bonding said at least one security element in said at least one groove includes the act of applying an adhesive to said at least one security element.

6. The process of claim 5, wherein said adhesive is a pressure sensitive adhesive.

7. The process of claim 4, wherein the act of bonding said at least one security element in said at least one groove includes the act of applying an adhesive in said at least one groove.

8. A process for making security paper comprising:

providing a post-manufactured paper having an upper surface and a lower surface;

forming at least one groove in one of said upper and lower surfaces of said paper, wherein said at least one groove is curvilinear;

placing at least one security element in said at least one groove;

applying a coating over at least a portion of said at least one security element within said at least one groove.

9. A process for making security paper comprising:

providing a post-manufactured paper having an upper surface and a lower surface;

forming at least one groove in one of said upper and lower surfaces of said paper;

placing at least one security element in said at least one groove;

applying a coating over at least a portion of said at least one security element within said at least one groove, wherein said coating comprises paper material.

10. A process for making security paper comprising:

providing a post-manufactured paper having an upper surface and a lower surface;

forming at least one groove in one of said upper and lower surfaces of said paper;

placing at least one security element in said at least one groove;

applying a coating over at least a portion of said at least one security element within said at least one groove, wherein a color of said coating substantially matches a color of said paper.

11. The process of claim 1, wherein said paper comprises a sheet of paper.

12. The process of claim 1, wherein said paper comprises a paper web.

13. The process of claim 1, wherein said at least one security element includes a surface comprising printed matter.

14. The process of claim 1, wherein said at least one security element comprises a fluorescent material.

15. The process of claim 1, wherein said at least one security element comprises an optically variable element.

16. The process of claim 1, wherein said at least one security element comprises a metallic material.

17. The process of claim 1, wherein said at least one security element comprises a magnetic material.

18. The process of claim 1, wherein said at least one security element comprises a plastic material.

19. The process of claim 1, wherein said at least one security element is selected from the group consisting of filaments, threads, and films.

20. The process of claim 1, in which the act of placing said at least one security element in said at least one groove comprises the act of varying the width of said at least one security element as said security element is applied to said paper.

21. The process of claim 20, wherein the act of varying the width of said at least one security element comprises varying at least one of a temperature, pressure or tension of said at least one security element as the security element is applied to said paper.

22. The process of claim 1, wherein said at least one security element is discontinuous along the extent of said groove.

23. The process of claim 22, wherein said at least one security element further comprises a plurality of interdispersed elements along the extent of said groove.

24. The process of claim 1, wherein said at least one groove is formed in a direction which is parallel to a machine direction of said paper.

25. The process of claim 1, wherein said at least one groove is linear.

26. The process of claim 1, wherein said coating is applied over a plurality of portions of said at least one security element.

27. The process of claim 26, wherein said coating over said plurality of portions forms printed matter.

28. The process of claim 1, wherein said coating comprises plastic material.

29. The process of claim 1, further comprising:

forming another groove in one of said upper and lower surfaces of said paper;

placing another security element in said another groove; and applying a coating over at least a portion of said another security element within said another groove.

30. The process of claim 29, wherein said at least one groove and said another groove are, formed on the same surface of said paper.

31. The process of claim 29, wherein said at least one groove and said another groove are formed on opposite surfaces of said paper.

32. The process of claim 29, wherein said at least one security element and said another security element overlap.

33. The process of claim 29, wherein said at least one security element is a first color and said another security element is a second color.

34. The process of claim 33, wherein said first color is different than said second color.

35. The process of claim 1, wherein said paper comprises material selected from the group consisting of wood pulp, vegetable fibers, and plant fibers.

36. The process of claim 1, wherein said paper comprises material selected from the group consisting of plastics, synthetics and polymeric films.

37. The process of claim 1, wherein said at least one groove is formed by abrading a portion of said upper or lower surface of said paper.

* * * * *